(12) United States Patent
Thibault

(10) Patent No.: US 8,538,604 B2
(45) Date of Patent: Sep. 17, 2013

(54) METHOD FOR DISTRIBUTING BRAKING TORQUE BETWEEN BRAKED WHEELS FITTED TO AT LEAST ONE UNDERCARRIAGE OF AN AIRCRAFT

(75) Inventor: Julien Thibault, Gif sur Yvette (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 0 days.

(21) Appl. No.: 13/439,206

(22) Filed: Apr. 4, 2012

(65) Prior Publication Data

US 2012/0271490 A1 Oct. 25, 2012

(30) Foreign Application Priority Data

Apr. 5, 2011 (FR) ...................................... 11 52944

(51) Int. Cl.
*G01C 23/00* (2006.01)

(52) U.S. Cl.
USPC .............................................. 701/3; 244/111

(58) Field of Classification Search
USPC .......... 701/3, 15; 188/1.11 L, 1.11 E; 303/1, 303/126; 244/111
See application file for complete search history.

(56) References Cited

U.S. PATENT DOCUMENTS

| | | | | |
|---|---|---|---|---|
| 7,506,941 B2 * | 3/2009 | Miller et al. | ................... | 303/191 |
| 7,865,289 B2 * | 1/2011 | Dellac et al. | .................... | 701/70 |
| 8,311,685 B2 * | 11/2012 | Dellac et al. | ....................... | 701/3 |
| 8,317,131 B2 * | 11/2012 | Regis et al. | .................... | 244/111 |
| 2004/0262994 A1 * | 12/2004 | Baumann et al. | ............. | 303/155 |
| 2005/0006524 A1 * | 1/2005 | Villaume et al. | ............... | 244/111 |
| 2005/0200198 A1 * | 9/2005 | Rudd | ............................. | 303/167 |
| 2005/0231030 A1 * | 10/2005 | Frank | ........................ | 303/126 |
| 2006/0191751 A1 * | 8/2006 | Miller et al. | ............. | 188/1.11 L |
| 2007/0132311 A1 * | 6/2007 | Giazotto | ........................ | 303/126 |
| 2008/0201025 A1 * | 8/2008 | Dellac et al. | ....................... | 701/3 |
| 2009/0065640 A1 * | 3/2009 | Regis et al. | .................... | 244/111 |
| 2009/0095576 A1 * | 4/2009 | Miller et al. | ............. | 188/1.11 E |
| 2009/0210126 A1 * | 8/2009 | Dellac et al. | .................... | 701/70 |
| 2010/0268404 A1 * | 10/2010 | DeVlieg et al. | .................... | 701/3 |
| 2010/0286881 A1 * | 11/2010 | Cahill | ............................. | 701/70 |

FOREIGN PATENT DOCUMENTS

| | | |
|---|---|---|
| EP | 1 712 441 A1 | 10/2006 |
| FR | 2 898 333 A1 | 9/2007 |
| FR | 2 918 637 A1 | 1/2009 |

* cited by examiner

*Primary Examiner* — Helal A Algahaim
(74) *Attorney, Agent, or Firm* — Sughrue Mion, PLLC

(57) ABSTRACT

A method for distributing braking energy between a group of the braked wheels numbered 1 ... p and fitted to N undercarriages of an aircraft, each of the braked wheels having a brake furnished with a stack of discs to which a load is selectively applied so as to generate a torque for braking the wheel. Each brake is equipped with a unit for measuring a thickness of the stack of discs, and in which—the setting $$C_j = \frac{E_j}{E_1 + \ldots + E_p} \cdot N \cdot C$$

is an individual setting of braking to be generated by brake j, where p is the number of wheels concerned, C is the general setting of braking to be developed by the braked wheels of one and the same undercarriage, $E_j$ is the thickness of the stack of discs of the brake of wheel j, and $C_j$ the individual braking setting for wheel j. Each brake is controlled according to the individual braking setting thus determined.

7 Claims, 2 Drawing Sheets

METHOD FOR DISTRIBUTING BRAKING TORQUE BETWEEN BRAKED WHEELS FITTED TO AT LEAST ONE UNDERCARRIAGE OF AN AIRCRAFT

The invention relates to a method for distributing braking torque between braked wheels fitted to at least one undercarriage of an aircraft.

TECHNOLOGICAL BACKGROUND OF THE INVENTION

On certain aircraft, and despite identical braking setting application, a heterogeneous distribution of the braking energy dissipated by the brakes may be observed, leading to heterogeneous disc stack heating and wear.

Moreover, certain brakes may attain or exceed a critical temperature threshold forcing the airline operating the aircraft to wait until these brakes have fallen in temperature before being able to commence a new rotation. This waiting time represents a loss of earnings for the airline.

SUBJECT OF THE INVENTION

The invention is aimed at proposing a method for distributing the braking energy between the brakes, allowing maximum avoidance of significant heating of certain brakes.

DESCRIPTION OF THE INVENTION

For this purpose, there is proposed a method for distributing the energy of an impending braking between braked wheels numbered 1 . . . p and fitted to N undercarriages of an aircraft, each of the braked wheels comprising a brake furnished with a stack of discs to which a load is selectively applied so as to generate a torque for braking the wheel, each brake being equipped with means for measuring a thickness of the disc stack, and in which the setting $$C_j = \frac{E_j}{E_1 + \ldots + E_p} \cdot N \cdot C$$

is assigned as individual setting of braking to be generated by brake j where C is the general setting of braking to be developed by the braked wheels of one of the undercarriages, $E_j$ is the thickness of the stack of discs of the brake of wheel j, and $C_j$ the individual braking setting for wheel j;

each brake j is controlled according to the individual braking setting $C_j$ thus determined.

Thus, the general setting of torque to be developed by the wheels concerned is distributed as a function of the thicknesses of the stacks of discs of each of the brakes. This general braking setting is generated for example by a braking computer. Thus, if the stack of discs of one of the brakes is more worn than the others, its thickness will be lower, and therefore the torque setting will be decreased accordingly.

Now, it is known that the energy to be dissipated by each brake is proportional to the torque developed by this brake during braking, while the heating of the corresponding stack of discs is for its part proportional to the mass of the material constituting the discs, and therefore to its thickness. By rendering, according to the invention, the torque to be developed proportional to this thickness, it is therefore ensured that the corresponding stack of discs will heat up in the same manner as the other stacks of discs.

This method is easily implemented on an aircraft equipped with electromechanical brakes, since it suffices to use the electromechanical braking actuators to perform a measurement of the thickness of the stacks of discs. For this purpose, it suffices, for example in flight before landing, to make the pusher of one of the electromechanical actuators come into contact with the discs. The position of the pusher is then logged, and the residual thickness of the stack of discs is deduced therefrom. This measurement is performed for each of the stacks of discs of the brakes concerned in the distribution, and the corresponding distribution coefficient, namely, for brake j:

$$\frac{E_j}{E_1 + \ldots + E_p}$$

is deduced therefrom for each of the brakes.

EXAMPLES OF IMPLEMENTATION

Figure 1:
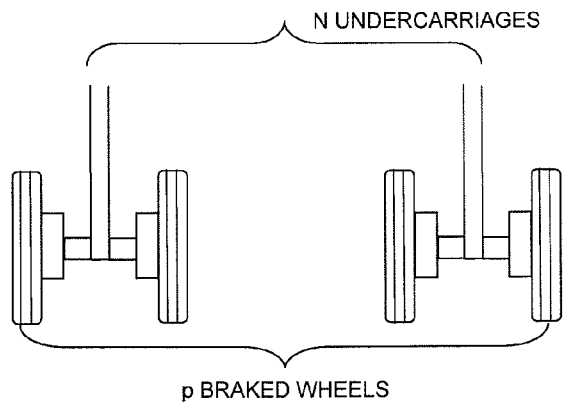
FIG. 1 is a schematic view of the N undercarriages of an aircraft carrying p braked wheels.
Figure 2:
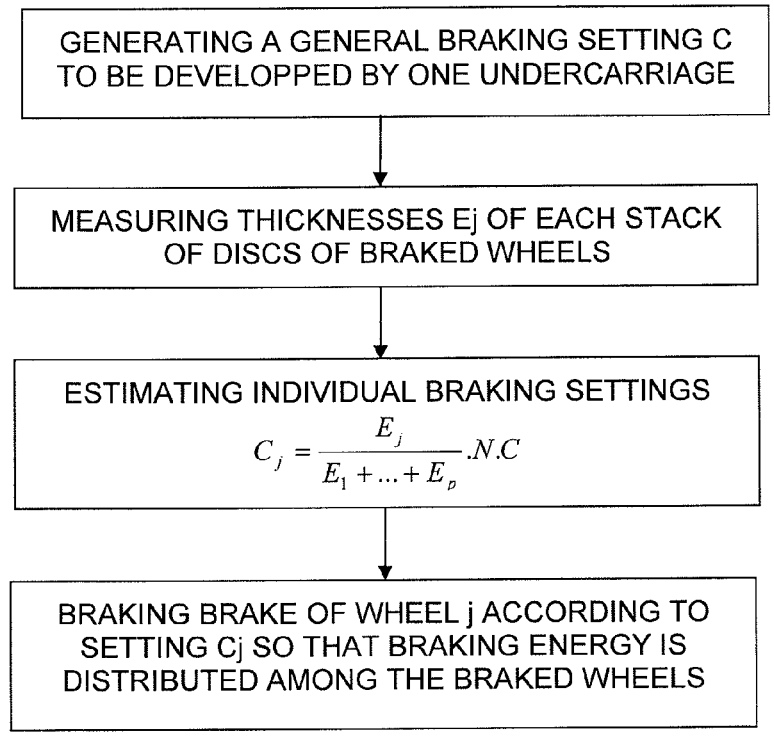
FIG. 2 is a diagram of a particular implementation of the method of the invention.

For an aircraft comprising two main undercarriages as illustrated in FIG. 1, viz. a left undercarriage and a right undercarriage, each comprising two braked wheels (respectively 1 and 2 for the left undercarriage and 3 and 4 for the right undercarriage), we will have respectively:

$$C_1 = \frac{E_1}{E_1 + E_2} \cdot C_g$$

$$C_2 = \frac{E_2}{E_1 + E_2} \cdot C_g$$

for the left undercarriage, and $$C_3 = \frac{E_3}{E_3 + E_4} \cdot C_d$$

$$C_4 = \frac{E_4}{E_3 + E_4} \cdot C_d$$

for the right undercarriage, where $C_g$ and $C_d$ are the general braking settings assigned respectively to the left undercarriage and the right undercarriage. Of course, it is noted that $C_1 + C_2 = C_g$ and $C_3 + C_4 = C_d$. We therefore choose here to apply the method of the invention undercarriage by undercarriage (N=1) according to the illustration in FIG. 2.

This distribution is very suitable when the general braking settings Cg and Cd are liable to be different, for example during differential braking, either requested by the pilot through differential depression of the brake pedals, or requested by the braking computer to aid the aircraft to turn while the latter is moving on the runway, or conversely to counter a tendency of the aircraft to turn, if it is desired that the latter move along a rectilinear trajectory.

Figure 3:
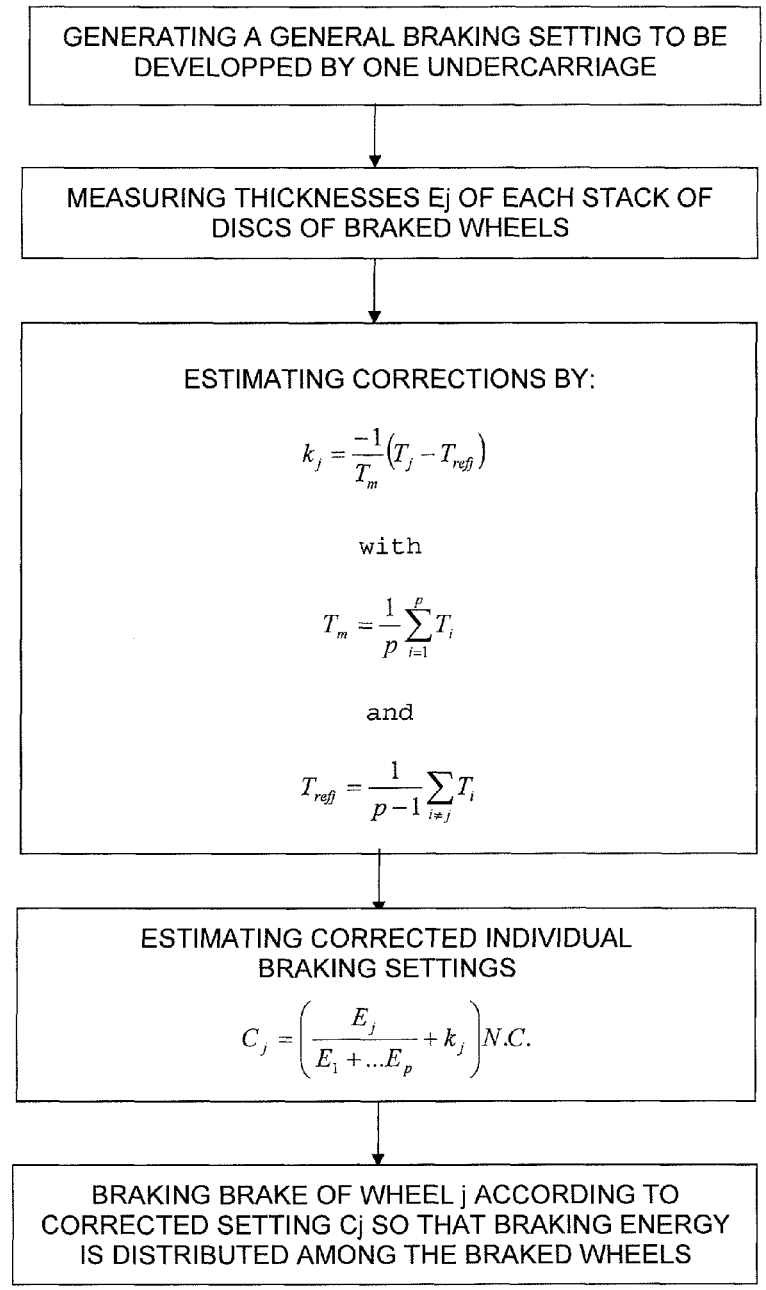
FIG. 3 is a diagram of a variant of the implementation of the method of the invention.

According now to a variant of the braking distribution method of the invention, as illustrated in FIG. 3, account is taken of thicknesses of the stacks of discs of the brakes fitted to several undercarriages.

This variant of the method is suitable in cases (for example in AUTOBRAKE mode) for which the general braking setting is identical for the undercarriages concerned. Denoting by C this general braking setting for each of the undercarriages, and returning to the previous example, the distribution is then effected as follows:

$$C_1 = \frac{E_1}{E_1 + E_2 + E_3 + E_4} \cdot 2C$$

$$C_2 = \frac{E_2}{E_1 + E_2 + E_3 + E_4} \cdot 2C$$

$$C_3 = \frac{E_3}{E_1 + E_2 + E_3 + E_4} \cdot 2C$$

$$C_4 = \frac{E_4}{E_1 + E_2 + E_3 + E_4} \cdot 2C$$

As before, we have $C_1+C_2+C_3+C_4=2 \cdot C$, where 2C represents the general braking setting to be applied by the set of wheels concerned. The distribution of braking over the set of braked wheels of the aircraft then makes it possible for the heating of the brakes to be made still more homogeneous.

This repetition is easily generalized to N undercarriages, the wheels of each of the undercarriages having collectively to develop a braking equal to the general braking setting C:

$$C_j = \frac{E_j}{E_1 + \ldots E_p} \cdot N \cdot C$$

where p is the total number of braked wheels fitted to the N undercarriages concerned.

According to a particular mode of implementation of the method of the invention, the individual braking settings thus computed are corrected so as to take account of an initial temperature of the disc stack of the corresponding brake. Thus, if one of the brakes has a stack of discs which is hotter than the others, matters will be contrived so as to decrease the corresponding individual braking setting, so as to decrease the impending heating on this brake. Of course, that portion of the braking that is not carried out by this brake will have to be developed by the other brakes.

An exemplary implementation of this correction is now detailed. Returning to the aforementioned example, $T_1$ and $T_2$ denote the initial temperatures of the stacks of discs of the brakes 1 and 2, $$T_m = \frac{1}{2}(T_1 + T_2)$$

denotes the mean temperature of these stacks of discs serving here as reference temperature and $\Delta = T_1 - T_2$ denotes the temperature deviation, we will have:

$$C_1 = \left(\frac{E_1}{E_1 + E_2} + k_1\right) \cdot C_g$$

-continued $$C_2 = \left(\frac{E_2}{E_1 + E_2} + k_2\right) \cdot C_g$$

where $$k_1 = \frac{-\Delta}{T_m}$$

and $$k_2 = \frac{\Delta}{T_m}.$$

This example is easily generalized to N undercarriages, the wheels of each of the undercarriages having collectively to develop a braking equal to the general braking setting C:

$$C_j = \left(\frac{E_j}{E_1 + \ldots E_p} + k_j\right) N \cdot C$$

where the corrector coefficient $k_j$ is equal to $$k_j = \frac{-1}{T_m}(T_j - T_{refj})$$

with $$T_m = \frac{1}{p}\sum_{i=1}^{p} T_i$$

and $$T_{refj} = \frac{1}{P-1}\sum_{i \neq j} T_i$$

Or, what amounts to the same, the individual braking setting $C_j$ is corrected by a torque correction $\Delta C_j$ equal to $$\Delta C_j = k_j \cdot N \cdot C,$$

the torque correction taking account of the initial temperature $T_j$ of brake j.

Thus, the temperature $T_j$ is compared with a reference temperature $T_{refj}$ equal to the mean of the temperatures of the other brakes. If the temperature $T_j$ is higher than this reference temperature, the correction $\Delta C_j$ is negative, the effect of which is to decrease the individual braking setting $C_j$.

The correction is of course not limited to the example described hereinabove. In a general manner, the correction will be dependent on the initial temperature of the stack of discs before braking is applied, it being suitable for decreasing the individual braking setting for a stack of discs having a higher initial temperature than a reference temperature.

Preferably, the torque correction is bounded, so as to avoid too big a differential of individual braking setting between two wheels. That part of the energy not dissipated by one brake because of the decrease in its individual braking setting will of course have to be dissipated by the other brakes concerned, thus making it necessary in practice to increase the individual braking setting of at least one of the other brakes.

The invention is of course applicable to an aircraft furnished with a hydraulic braking system. However, it will be appropriate to equip the brakes with measurement sensors generating a signal that may be used to estimate the thickness of the stack of discs.

The expression braking setting is understood to denote any setting representative of a braking load to be applied to the stack of discs of a given brake, or of a braking torque to be developed by the said brake. However, the method of the invention is more effective if the settings are torque settings. This therefore assumes that the brakes are equipped with means for measuring the torque, or at the very least with means for estimating the latter.

The invention claimed is:

1. A method of managing braking of an aircraft having a group of the braked wheels numbered 1 ... p and fitted to N undercarriages of the aircraft, each of the braked wheels comprising a brake having a stack of discs to which a load is selectively applied so as to generate a torque for braking the wheel, each brake being equipped with means for measuring a thickness of the stack of discs, said method comprising:

controlling a braking computer for generating a general breaking setting C to be developed by the braked wheels of one undercarriage;

for each wheel j measuring a thickness $E_j$ of the stack of discs of the associated brake;

for each wheel j, estimating an individual braking setting $$C_j = \frac{E_j}{E_1 + \ldots + E_p} \cdot N \cdot C;$$

to be generated by the associated brake of wheel j when braked; and controlling brake of wheel j according to the individual braking setting $C_j$, so that braking energy is distributed among the brakes of the braked wheels of the group proportionally to the discs stacks thicknesses.

2. The method according to claim 1, in which wheels (1 ... p) are all fitted to the same undercarriage (N=1).

3. The method according to claim 1, in which, for at least one of the brakes, the individual braking setting $C_j$ is corrected with a correction ($\Delta C_j$) dependent on an initial temperature ($T_j$) of the stack of discs before braking is applied, so that the individual braking setting of the said brake is decreased if the initial temperature of the latter ($C_j$) is higher than a reference temperature.

4. The method according to claim 3, in which the reference temperature is the mean of the temperatures of the other brakes.

5. The method according to claim 4, in which the correction ($\Delta C_j$) is equal to $C_j = k_j \cdot N \cdot C$, where $$k_j = \frac{-1}{T_m}(T_j - T_{refj})$$

with $$T_m = \frac{1}{p}\sum_{i=1}^{p} T_i$$

and $$T_{refj} = \frac{1}{P-1}\sum_{i \neq j} T_i.$$

6. The method according to claim 1, in which the correction is bounded.

7. The method according to claim 1, in which the general braking setting is a braking torque setting.

* * * * *